United States Patent
Nishigaki

(10) Patent No.: US 7,145,700 B1
(45) Date of Patent: Dec. 5, 2006

(54) IMAGE PROCESSING SYSTEM INCLUDING SYNCHRONOUS TYPE PROCESSING UNIT AND ASYNCHRONOUS TYPE PROCESSING UNIT AND IMAGE PROCESSING METHOD

(75) Inventor: Junji Nishigaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/432,927

(22) Filed: Nov. 3, 1999

(30) Foreign Application Priority Data

Nov. 9, 1998 (JP) ................... 10-317997

(51) Int. Cl.
*H04N 1/40* (2006.01)
*H04N 1/32* (2006.01)

(52) U.S. Cl. ........................ 358/468; 358/448

(58) Field of Classification Search ............... 358/448, 358/450, 468, 400, 444, 404, 474; 348/564, 348/565; 709/204, 213
See application file for complete search history.

(56) References Cited

U.S. PATENT DOCUMENTS

| | | | |
|---|---|---|---|
| 4,891,768 A * | 1/1990 | Williams ................... 364/518 |
| 5,043,827 A * | 8/1991 | Beikirch ................... 358/471 |
| 5,659,402 A | 8/1997 | Fujita et al. ............... 358/467 |
| 5,996,002 A * | 11/1999 | Katsurabayashi et al. ... 709/204 |
| 6,154,202 A * | 11/2000 | Hara ......................... 345/213 |
| 6,353,460 B1 * | 3/2002 | Sokawa ..................... 348/355 |
| 6,356,314 B1 * | 3/2002 | Takebe ...................... 348/564 |
| 6,430,635 B1 * | 8/2002 | Kwon ....................... 710/104 |
| 6,456,335 B1 * | 9/2002 | Miura ....................... 348/588 |
| 2002/0049985 A1 * | 4/2002 | Olshansky et al. ......... 725/146 |
| 2003/0161521 A1 * | 8/2003 | Newport et al. ........... 382/131 |
| 2004/0042038 A1 * | 3/2004 | Hiroyoshi ................. 358/1.15 |

FOREIGN PATENT DOCUMENTS

| JP | 10-028221 | | 1/1998 |
|---|---|---|---|
| JP | 2000-270259 | * | 9/2000 |
| WO | WO98/40874 | * | 9/1998 |

\* cited by examiner

*Primary Examiner*—Jerome Grant, II
(74) *Attorney, Agent, or Firm*—Sidley Austin LLP

(57) ABSTRACT

In order to improve the processing speed in an apparatus that carries out a plurality of image processing on image data, an image processing system carries out image processing that allows high speed processing such as γ correction on all the region in document image data. Image processing is carried out by an asynchronous type circuit such as an MPU on a region that requires matrix operation such as the text region in the document image data. By synthesizing the processed results, one image data is obtained.

5 Claims, 10 Drawing Sheets

IMAGE PROCESSING SYSTEM INCLUDING SYNCHRONOUS TYPE PROCESSING UNIT AND ASYNCHRONOUS TYPE PROCESSING UNIT AND IMAGE PROCESSING METHOD

This application is based on Japanese Patent Application No. 10-317997 filed in Japan, the contents of which are hereby incorporated by reference.

BACKGROUND OF THE INVENTION

1. Field of the Invention

The present invention relates to image processing systems, particularly to an image processing system including a synchronous type processing unit and an asynchronous type processing unit.

2. Description of the Related Art

A conventional image processing apparatus is known that reads out image data stored in a memory to carry out image processing on the read out image data. The image processing apparatus can be formed of a synchronous type or an asynchronous type circuit. A hardware circuit such as the ASIC (application specific integrated circuit) is exemplary of the synchronous type circuit. A circuit that carries out a process with software formed of a MPU (microprocessor) and the like is exemplary of the asynchronous type circuit.

The conventional image processing apparatus imposes problems set forth in the following.

In an image processing apparatus entirely formed of the synchronous type circuit, the processing speed is determined by the process of the heavy load. There was a problem that the process is slowed down even if it is not necessary to carry out a heavy load process. This is because a process corresponding to the time consumed for the heavy load process is required whatever image data is processed. For example, in a synchronous type circuit 900 shown in FIG. 11 including a line memory 901, a matrix processing unit 903 and a γ correction unit 905, data delay occurs since image data of N lines must always be stored in line memory 901. Also, since a complicated matrix operation process (for example, integration of floating point) is carried out, data (operational result) delay occurs.

When the entirety is implemented by the synchronous type circuit, the synchronous circuit per se becomes complex and lacks flexibility. When the resolution or the like of the image data is altered, the entire structure of the apparatus must be modified, resulting in increase in cost.

When the entirety of the image processing apparatus is implemented by the asynchronous type circuit, high speed processing is degraded.

SUMMARY OF THE INVENTION

In view of the foregoing, an object of the present invention is to provide an image processing apparatus that allows high speed processing, and that prevents increase in the cost when the resolution or the like is altered.

According to an aspect of the present invention, an image processing system includes a synchronous type processing unit carrying out a first image process on image data that is the subject of processing, an asynchronous type processing unit carrying out a second image process on image data of a predetermined region out of the image data that is the subject of processing, and a synthesize unit synthesizing the output of the synchronous type processing unit with the output of the asynchronous type processing unit to form one image data.

Preferably, the synthesize unit includes a memory storing the output of the synchronous type processing unit, and a replacement unit replacing a portion of the output of the synchronous type processing unit stored in the memory with the output of the asynchronous type processing unit.

Further preferably, the image processing system includes a controller controlling the replacement timing by the replacement unit by detecting the state of the output of the synchronous type processing unit stored in the memory.

The asynchronous type processing unit carries out a second image process only on image data of a predetermined region. Therefore, an image processing system that allows high speed processing is provided. When there is no predetermined region on which the second image process is to be carried out, only the output of the synchronous type processing unit is to be used. Therefore, high speed processing is allowed.

The asynchronous type processing unit has flexibility. Therefore, it is easy to modify only the processing contents that require modification (for example N-dimensional process) when the resolution or the like of the image data is altered. Thus, increase in the cost can be suppressed even in the case where the resolution or the like is altered.

By carrying out the second image process through the asynchronous processing unit during the process through the synchronous type processing unit, the process can be further speeded.

According to another aspect of the present invention, an image processing system includes a first image processor formed of a hardware circuit, and carrying out a first image process on input image data, a second image processor carrying out a second image process on a portion of the input image data according to a program of predetermined software, and a memory in which image data subjected to the first image process and the image data subjected to the second image process are synthesized and stored.

Preferably in the image processing system, the data of the memory in which image data subjected to the first image process is stored is replaced with image data subjected to the second image process.

Preferably, the second image processor detects the write timing of the image data subjected to the first image process into the memory to control the write timing into the memory.

Preferably, the software is rewritable.

Preferably, the second image processor detects the region of carrying out the second image process by scanning the input image data.

According to a further aspect of the present invention, an image processing method includes the steps of carrying out a first image process on input image data through a hardware circuit, carrying out second image process on a portion of the input image data through software, and synthesizing image data subjected to the first image process with image data subjected to the second image process. The sequence of the first and second image processes is arbitrary.

Preferably, the second image process step includes the step of detecting the region of carrying out the second image process by scanning the input image data and carrying out the second image process on the detected region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
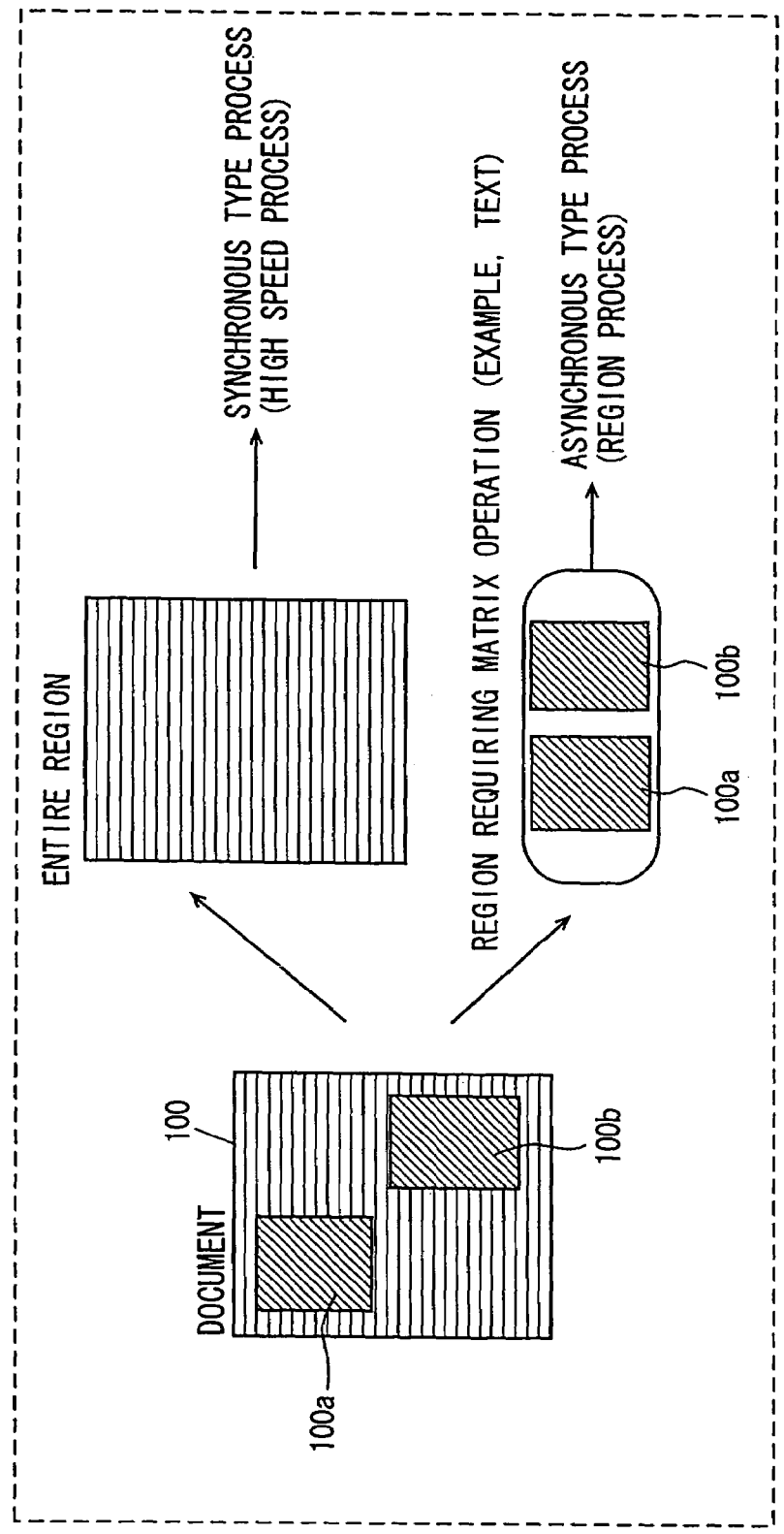
FIG. 1 is a diagram to describe an operation of an image processing apparatus according to the present invention.

Referring to FIG. 1, an image process of light load is carried out on the entire region of document image data 100 by means of a synchronous type circuit. The result is written into a memory. An asynchronous circuit carries out a process such as matrix operation on regions (for example, text region) 100a and 100b in document image data 100 that require processing of heavy load. The processed result of the asynchronous type circuit is overwritten on the memory in which the processed result of the synchronous type circuit has been written.

The synchronous type circuit carries out high speed image processing on the entire region of the document image data whereas the asynchronous type circuit carries out image processing exclusively on the region that requires heavy load processing such as a matrix operation. The process carried out by the synchronous type circuit includes the one-dimensional process such as γ correction. The process carried out by the asynchronous circuit includes the two-dimensional process such as edge enhancement process on a text region and smoothing process on a halftone dot region.

Here, a synchronous circuit refers to a hardware circuit such as an ASIC. An asynchronous circuit refers to a circuit that is formed of a MPU and the like carrying out a process with software.

By virtue of the flexibility of the asynchronous type circuit, the processing data can be modified easily when the resolution or the like of the image data is altered. Therefore, increase in cost can be suppressed.

In other words, the software of the asynchronous type circuit is formed in a rewritable manner.

Figure 2:
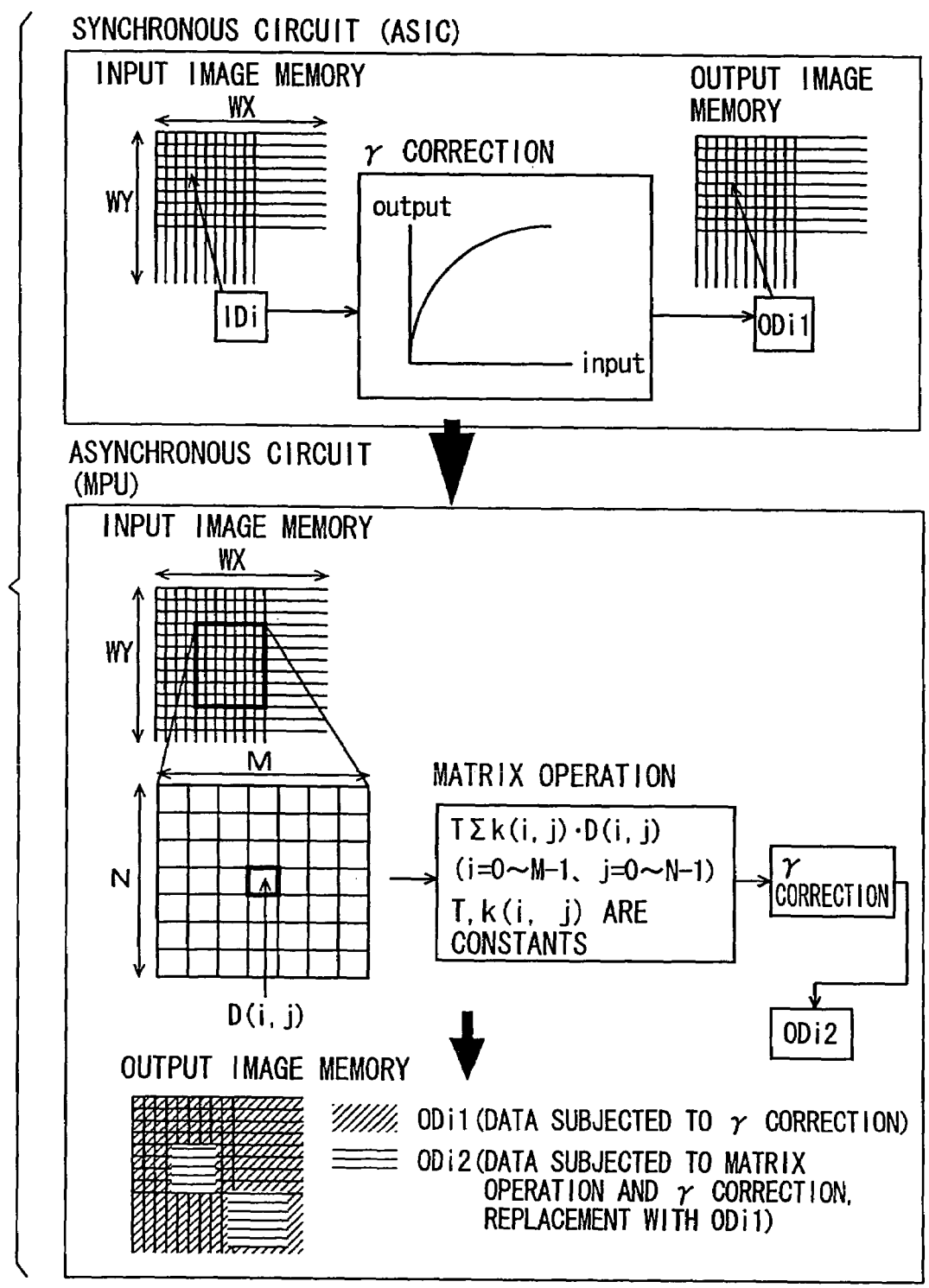
FIG. 2 is a diagram to describe in further detail the process of FIG. 1.

FIG. 2 is a diagram to describe in further detail the operation of the image processing apparatus. Referring to FIG. 2, the image of interest is stored in an input image memory having the capacity of WX pixels horizontally and WY pixels vertically. Data IDi of one pixel in the input image memory is read out in series and subjected to γ correction with a predetermined function to become γ corrected data ODi1.

γ corrected data ODi1 is recorded at a corresponding address in the output image memory. γ correction is carried out on all the pixels.

When a pixel of interest (target pixel) in the input image memory resides in a region of interest that requires matrix operation, a matrix operation is carried out on the target pixel. It is assumed that the address of the target pixel is (X, Y), and data of that address is D (X, Y). The matrix, i.e. the mask region of the filter process, has the size of M in the X direction and N in the Y direction, centered about the target pixel. The mask is k (i, j). Data D' (X, Y) subjected to the matrix operation is represented by the following equation.

$$D'(X,Y)=T\Sigma[k(i,j)D(x-(M-1)/2+i, Y-(N-1)/2+j)]$$

where T, k (i, j) are constants, and i=0, . . . , M−1; j=0, . . . , N−1. Then, γ correction is carried out on this data to result in data ODi2. This process is carried out on all the pixels in the region of interest of the matrix operation.

When image data of M×N centered about the target pixel is read out from the input image memory and readdressed, the above equation can be presented as:

$$D'(X,Y)=T\Sigma[k(i,j)D(i,j)]i=0,\ldots,M-1; \\ j=0,\ldots,N-1 \quad (1)$$

First, γ corrected data ODi1 is written into the output image memory, and then data ODi2 subjected to the matrix operation and γ correction is written into a predetermined region.

First Embodiment

Figure 3:
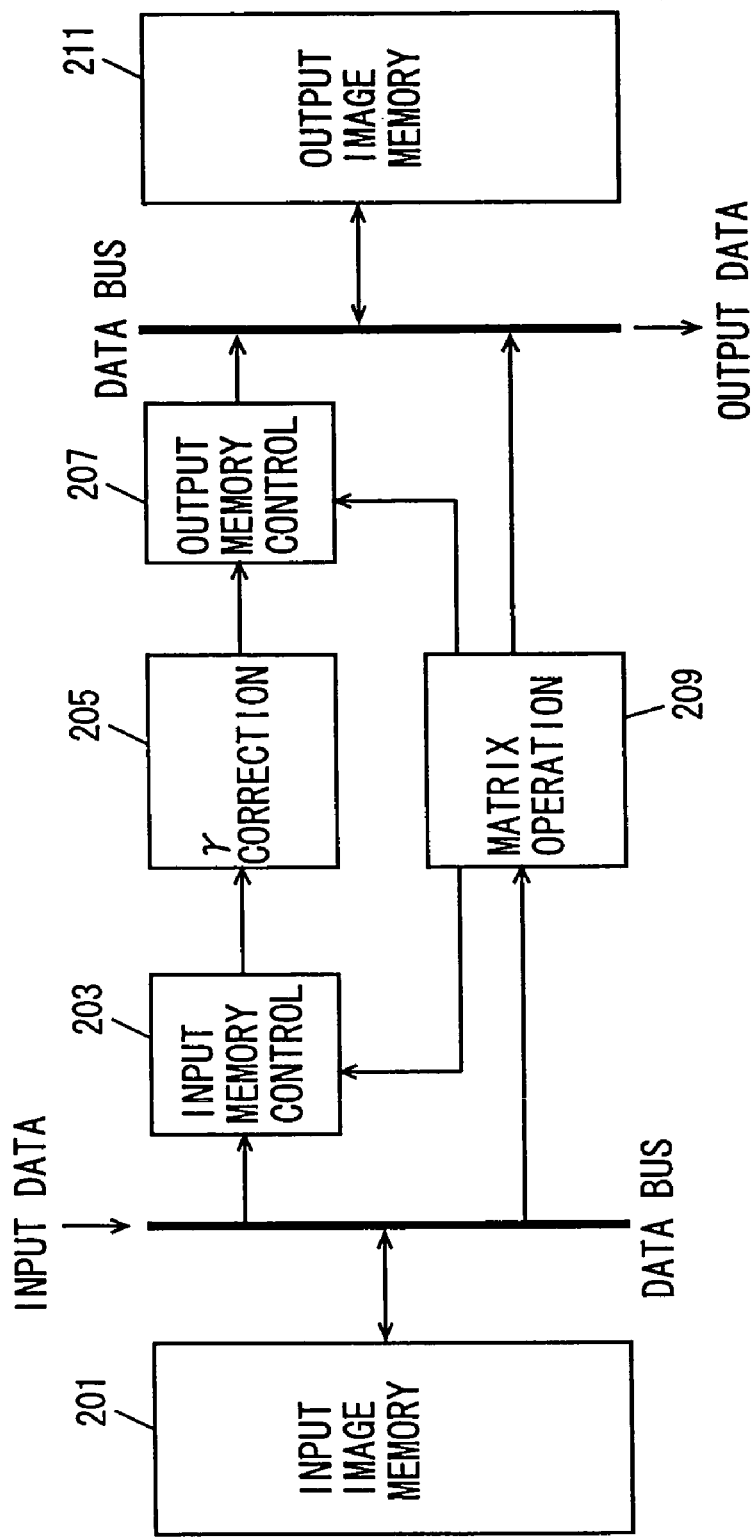
FIG. 3 is a block diagram of an image processing apparatus according to a first embodiment of the present invention.

FIG. 3 is a block diagram showing a structure of an image processing apparatus according to a first embodiment of the present invention. Referring to FIG. 3, the image processing apparatus includes an input image memory 201, an input memory control unit 203, a γ correction unit 205, an output memory control unit 207, a matrix operation unit 209, and an output image memory 211. For the process of input data, a data bus for input data is used. For the process of the output data, a data bus for output data is used.

Image data input by means of a scanner and the like is stored in input image memory 201. The storage capacity of input image memory 201 corresponds to WX×WY for a monochromatic image, corresponds to WX×WY×3 for a color (RGB) image, and corresponds to WX×WY×4 for a color (CMYK) image, when the size of the image data is (number of main scanning pixels, number of sub scanning pixels)=(WX, WY). For the sake of simplification, it is assumed that the storage capacity of input image memory 201 is WX×WY in the following. Although image data coding is not effected in the present embodiment, the memory capacity of input image memory 201 can be reduced by carrying out a coding process.

Input memory control unit 203, γ correction unit 205 and output memory control unit 207 are implemented by an ASIC circuit (synchronous type circuit) that allows high speed processing since the circuits are formed of relatively simple logics. Matrix operation unit 209 is formed of a MPU (asynchronous type circuit) that allows complicated operation to read out image data of M×N pixels and apply a complicated operation thereon.

Under DMA (direct memory access) control, input memory control unit 203 reads out image data stored in input image memory 201 sequentially from the start address to the end address (start address+WX×WY). Input memory control unit 203 includes an internal register in which a status flag (imb flag) is held indicating whether access to input image memory 201 is busy or not.

γ correction unit 205 converts and outputs the input data according to a table of output data (8 bits: 0–255) corresponding to the input data (8 bits: 0–255).

Under DMA control, output memory control unit 207 sequentially writes the γ-corrected data from the start address up to the end address (start address+WX×WY) into output image memory 211. Output memory control unit 207 includes an internal register in which a status flag (omb flag) is held indicating whether access to output image memory 211 is busy or not.

Matrix operation unit 209 monitors the imb flag of input memory control unit 203 to read out the data of M×N pixels including the target pixel by random access from input image memory 201 when the imb flag indicates a non-busy state. Then, the matrix operation such as edge enhancement is carried out on the text region and smoothing on the halftone region. Matrix operation unit 206 further carries out a process likewise the γ correction formed of logic. Matrix operation unit 209 monitors the omb flag of output memory control unit 207 to write the resultant data of the matrix operation into the address of output image memory 211 corresponding to the target pixel when the omb flag indicates a non-busy state. Accordingly, γ-corrected data from γ correction unit 205 is replaced in output image memory 211.

The region on which matrix operation is to be carried out can be determined by matrix operation unit 209. Alternatively, a region determined in advance can be input through the data bus.

The output image data subjected to γ correction and matrix operation in output image memory 211 is provided to a printer engine and the like through the data bus.

When image data is written into input image memory 201 in the present embodiment, input memory control unit 203, γ correction unit 205 and output memory control unit 207 carry out a one-dimensional process of light load such as γ correction on the image data in input image memory 201. Since the imb flag in input memory control unit 203 indicates a busy state during this process, matrix operation unit 209 cannot read out data from input image memory 201.

Following the γ correction on all the image data in input image memory 201, matrix operation unit 209 extracts image data that is the subject of processing from a predetermined region of the image data stored in input image memory 201. A two-dimensional process is applied on the extracted image data. The processed result is overwritten on the predetermined region in output image memory 211.

Figure 4:
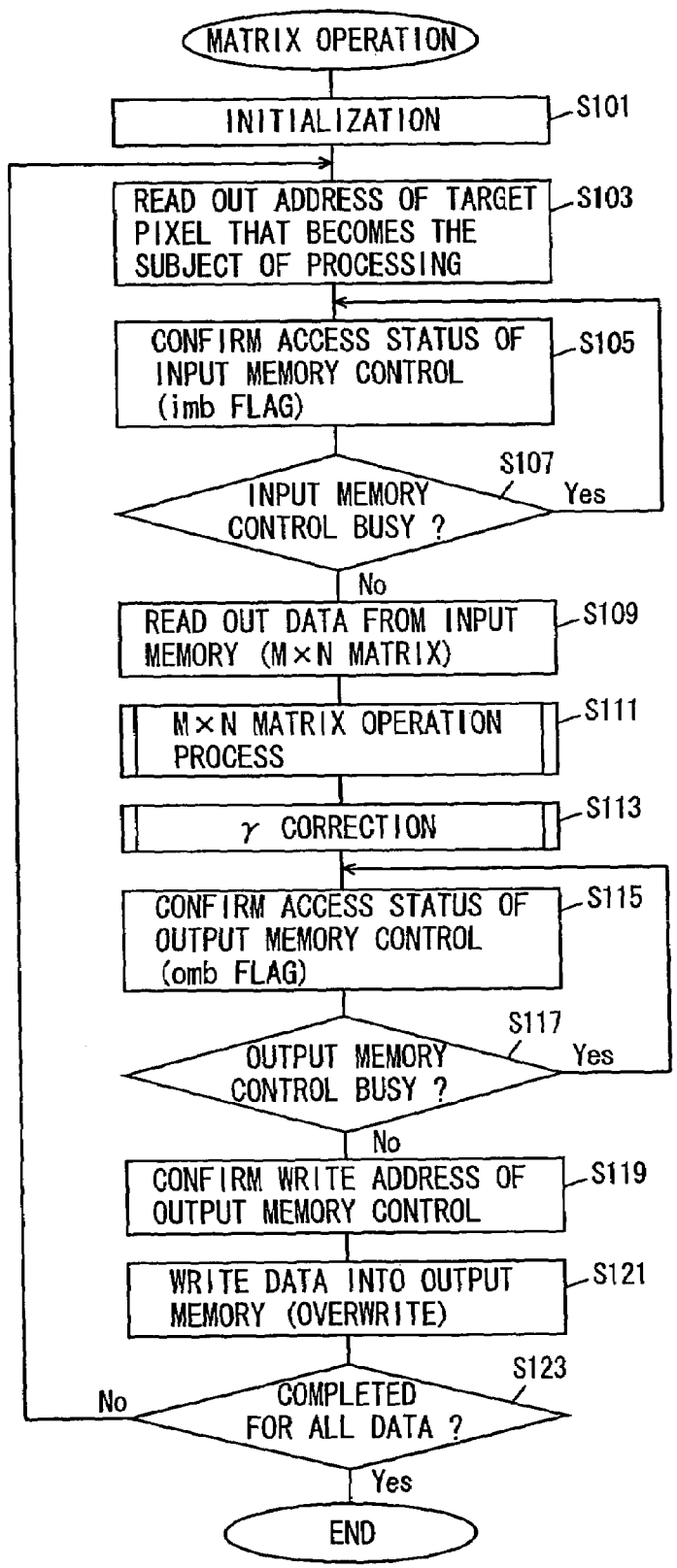
FIG. 4 is a flow chart of the process of a matrix operation unit 209 of FIG. 3.

FIG. 4 is a flow chart for describing the process carried out by matrix operation unit 209. Referring to FIG. 4, initialization is carried out at step S101. At S103, the address of the target pixel that becomes the subject of processing in input image memory 201 is determined. At step S105, the access status (imb flag) of input memory control unit 203 is confirmed. Waiting is conducted when the imb flag indicates a busy state (S107).

When the imb flag indicates a non-busy state, control proceeds to step S109 where image data of the matrix of M×N centered about the target pixel is read out. At step S111, the operation process of the M×N matrix is carried out.

At step S113, γ correction is carried out on the image data subjected to the operation process.

At step S115, the access state (omb flag) of output memory control unit 207 is confirmed. At step S117, waiting is conducted until the omb flag of output memory control unit 207 indicates a non-busy state. At step S119, the write address of output image memory 211 is confirmed by output memory control unit 207. This causes the writing of the data subjected to matrix operation to attain a standby state until γ-corrected data is written into the address of the target pixel by output memory control unit 207. At step S121, the data subjected to matrix operation is overwritten in output image memory 211.

At step S123, determination is made whether the matrix operation has been completed for all the pixels in the region of interest for the matrix operation. The routine ends when YES. When NO at step S123, control returns to step S103.

According to the above-described steps of S105 and 107, matrix operation unit 209 reads out the image data from input image memory 201 when input memory control unit 203 is not busy. Accordingly, the access of input image memory 201 by input memory control unit 203 is given priority.

By the above-described steps of S115 and S117, the writing operation by matrix operation unit 209 is carried out when output memory control unit 207 is not busy. Accordingly, access to output image memory 211 by output memory control unit 207 is given priority. A memory storing the processed result of one line can be provided in output memory control unit 207. Output memory control unit 207 may access output image memory 211 only when the process of one line has been completed by output memory control unit 207 and the process of the next line has not yet been initiated.

Second Embodiment

The image processing apparatus according to the second embodiment of the present invention has a structure identical to that of the first embodiment. Therefore, description thereof will not be repeated. The image processing apparatus of the second embodiment executes the flow chart represented in FIG. 5 instead of the process represented in FIG. 4. The image processing apparatus of the present embodiment is characterized in that a halftone region or an edge region is detected and image processing carried out on the detected region by scanning the image data stored in input image memory 201.

Figure 5:
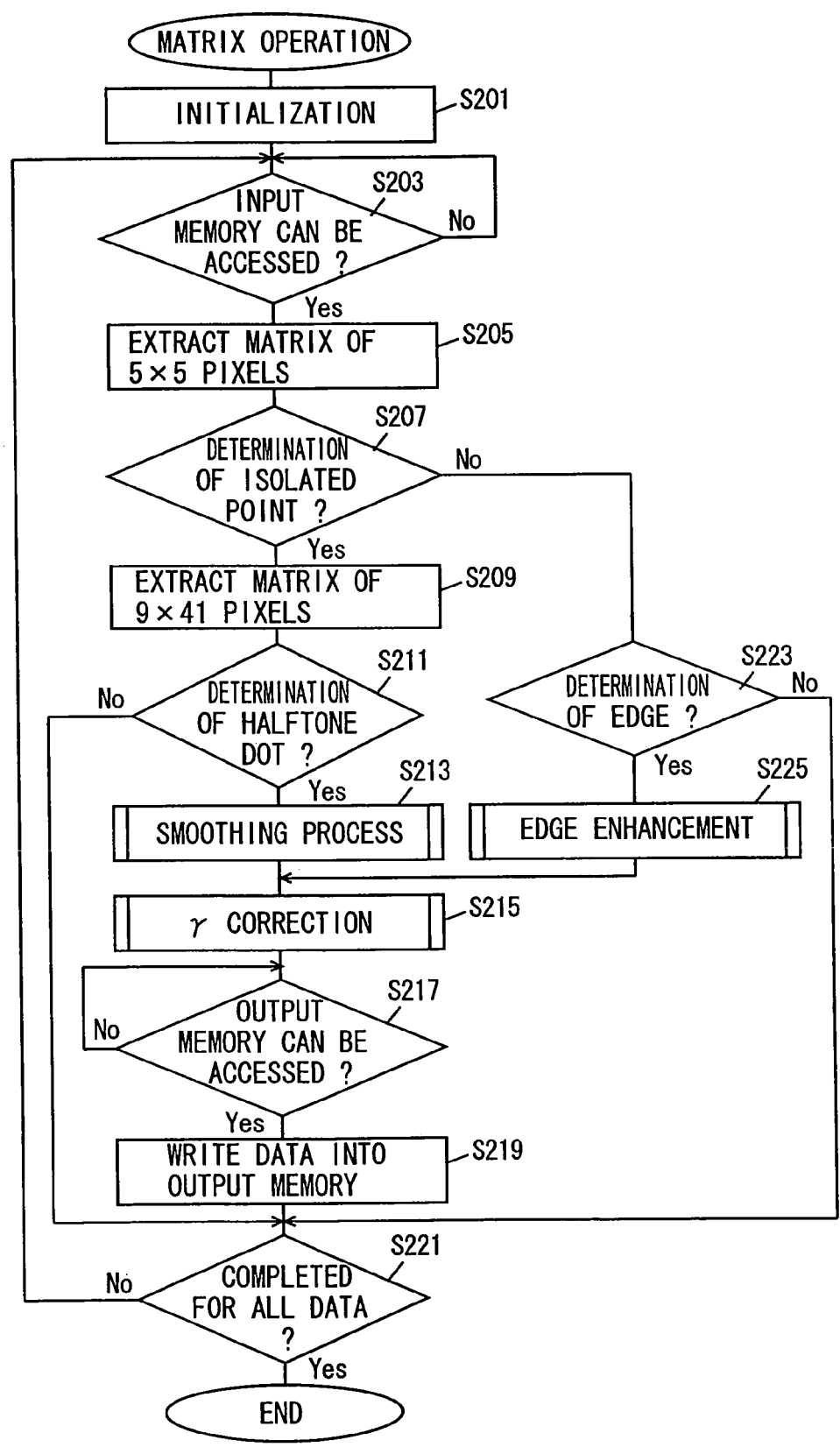
FIG. 5 is a flow chart of the process carried out by the matrix operation unit of an image processing apparatus according to a second embodiment of the present invention.

Referring to FIG. 5, initialization is cared out at step S201. At step S203, determination is made whether input image memory 201 can be accessed or not by referring to the imb flag. Waiting is conducted until access is allowed.

At step S205, a matrix of 5×5 pixels centered about the target pixel is extracted from the image data stored in input image memory 201. At step S207, determination is made whether the target pixel is an isolated point or not. When YES at S207, control proceeds to step S209 where a larger matrix of 9×41 pixels is extracted, and then determination is made whether that matrix corresponds to a halftone image or not (S211).

When YES at S211, control proceeds to step S213 to carry out a smoothing process using the data of the 5×5 pixels. Then, control proceeds to step S215 to carry out a γ correction. At step S217, the omb flag is confirmed to determine whether access to output image memory 211 is allowed or not. When access to output image memory 211 is allowed, control proceeds to step S219 to write the data into output image memory 211. At step S221, determination is made whether the process has been completed for all the data. When YES at step S221, the routine ends.

When NO at step S221, control returns to step S203. Also, when NO at step S221, control proceeds to step S221.

When determination is made that the target pixel is not an isolated point at step S207, control proceeds to step S223 to determine whether the subject is an edge image. When YES, control proceeds to step S225 to carry out edge enhancement. Then, control proceeds to step S215.

When NO at step S223, control proceeds to step S221.

The processing time by the matrix operation unit according to the present embodiment is set forth in the following.

(processing time of target pixel when corresponding to halftone dot)=(matrix read out time of 5×5 pixels)+(time for determining an isolated point)+(matrix read out time of 9×41 pixels)+(time for determining halftone dot)+(time for smoothing process of 5×5 pixels)+(time for γ correction)

(processing time of target pixel when corresponding to edge)=(matrix read out time of 5×5 pixels)+(time for determining an isolated point)+(time for edge enhancement process of 5×5 pixels)+(time for γ correction)

(processing time of target pixel when not corresponding to edge or halftone dot, and is not an isolated point)=(matrix read out time of 5×5 pixels)+(time for determining an isolated point)

(processing time of target pixel when not corresponding to edge or halftone dot, and is an isolated point)=(matrix read out time of 5×5 pixels)+(time for determining an isolated point)+(matrix read out time of 9×41 pixels)+(time for determining a halftone dot)

In view of the foregoing, the relationship of the processing time is established as follows:

(processing time of target pixel when not corresponding to edge or halftone dot, and is not an isolated point)<(processing time of target pixel when corresponding to edge)<(processing time of target pixel when not corresponding to edge or halftone dot, and is an isolated point)<(processing time of target pixel corresponding to halftone dot).

Third Embodiment

Figure 6:
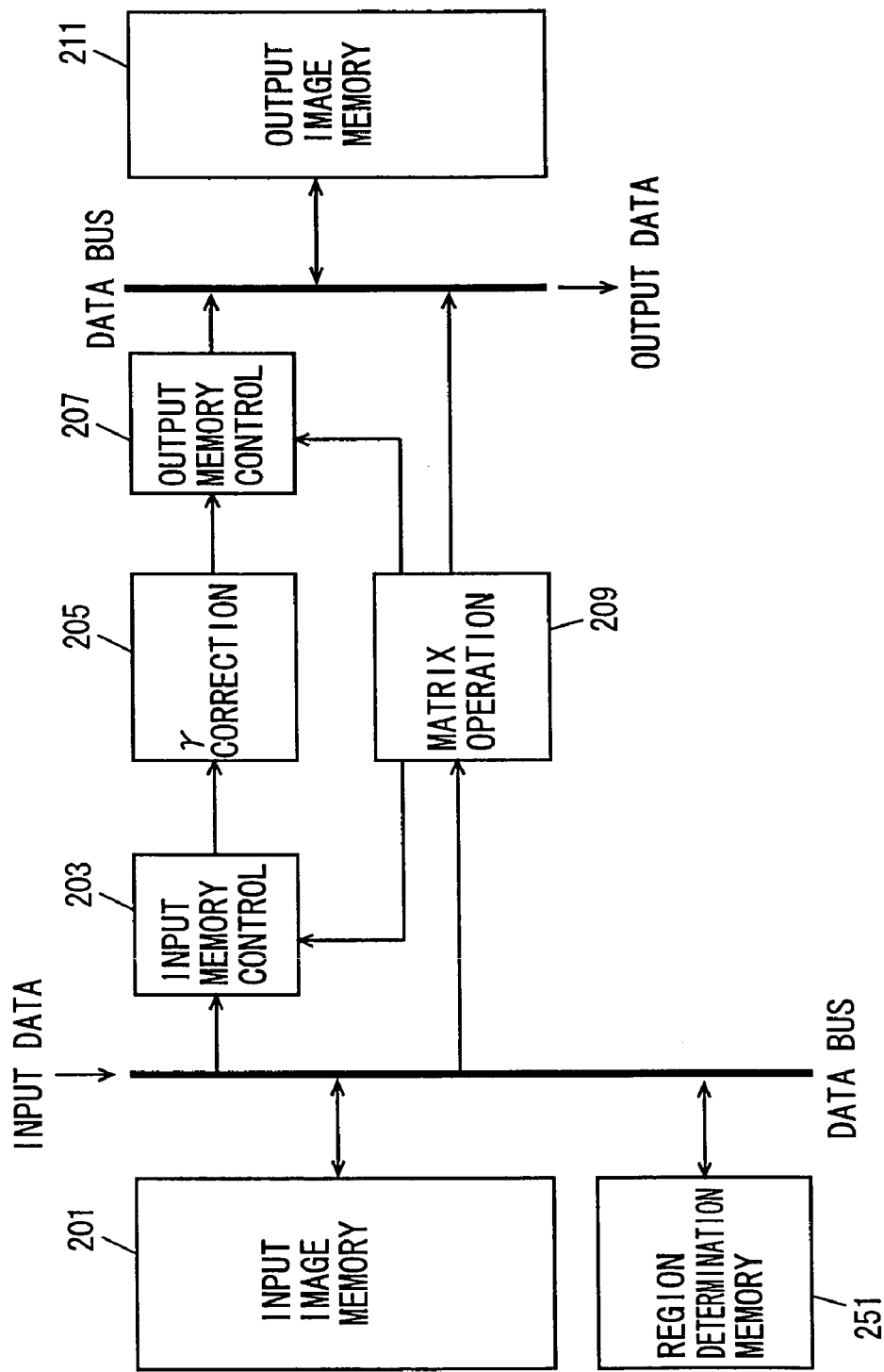
FIG. 6 is a block diagram of an image processing apparatus according to a third embodiment of the present invention.

FIG. 6 is a block diagram showing a structure of an image processing apparatus according to a third embodiment of the present invention. The image processing apparatus of the third embodiment corresponds to the image processing apparatus of the first embodiment shown in FIG. 3 with a region determination memory 251 connected to the data bus. Determination of a region of the image data stored in input image memory 201 is recorded in advance in region determination memory 251. In the present embodiment, region determination memory 251 distinguishes whether one pixel of the image data stored in input image memory 201 corresponds to an edge region, a halftone region, or a region other than the edge or halftone region.

Figure 7:
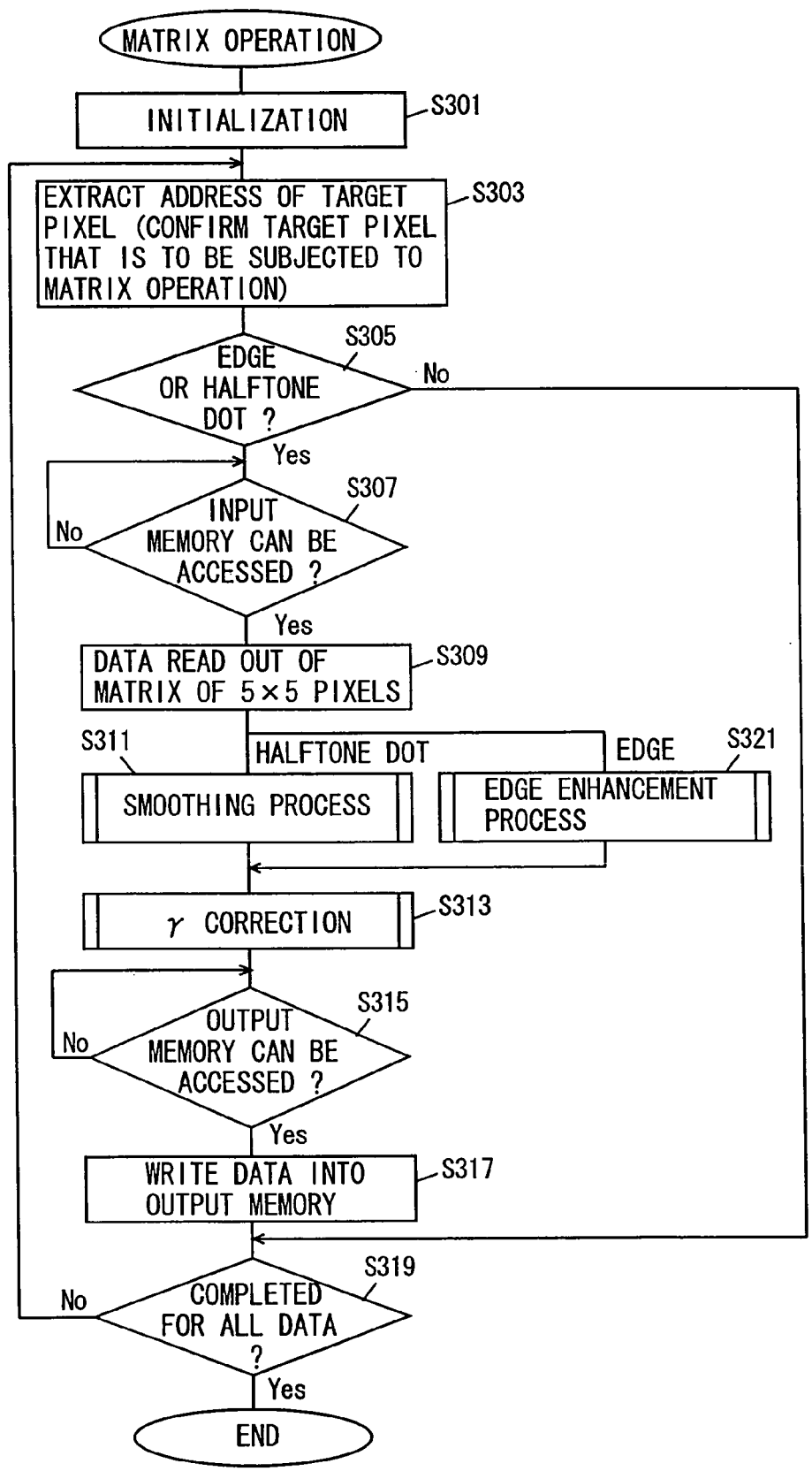
FIG. 7 is a flow chart of a process of a matrix operation unit 209 of FIG. 6.

FIG. 7 is a flow chart of the process carried out by matrix operation unit 209 of the third embodiment.

At step S301, initialization is carried out. At step S303, the address of the target pixel is extracted.

At step S305, determination is made whether the target pixel corresponds to an edge region or a halftone region by region determination memory 251. When the target pixel corresponds to an edge or halftone region, control proceeds to step S307 to determine whether access to input image memory 201 is allowed or not through the imb flag. Waiting is conducted until access is allowed. At step S309, the data of the matrix of 5×5 pixels around the target pixel is read out. A smoothing process is carried out if the target pixel corresponds to a halftone region (S311). An edge enhancement process is carried out if the target pixel corresponds to an edge region (S321). Then, γ correction is carried out on the data of the target pixel (S313). Next, determination is made whether output image memory 211 can be accessed or not through the omb flag. Waiting is conducted until access is allowed (S315).

At step S317, image data is written into output image memory 211. At step S319, determination is made whether the process of all the data has been completed or not. When YES at step S319, the main routine ends.

When NO at step S319, control returns to step S303. When NO at S305, control proceeds to step 319.

The processing time by the matrix operation unit in the third embodiment is set forth in the following.

(processing time of target of interest when corresponding to a halftone dot)=(time for reading out determination of target pixel)+(read out time of 5×5 pixels)+(time for smoothing process of 5×5 pixels)+(time for γ process)

(processing time of target pixel when corresponding to edge)=(time for reading out determination result of target pixel)+(read out time of 5×5 pixels)+(processing time for edge enhancement of 5×5 pixels)+(time for γ correction)

(processing time of target pixel when not corresponding to edge or halftone dot)=(time for reading out determination result of target pixel)

In view of the foregoing, the relationship of the processing time is established as follows:

(processing time of target pixel when not corresponding to edge or halftone dot)<(processing time of target pixel when corresponding to halftone dot)<(processing time of target pixel when corresponding to edge)

Fourth Embodiment

Figure 8:
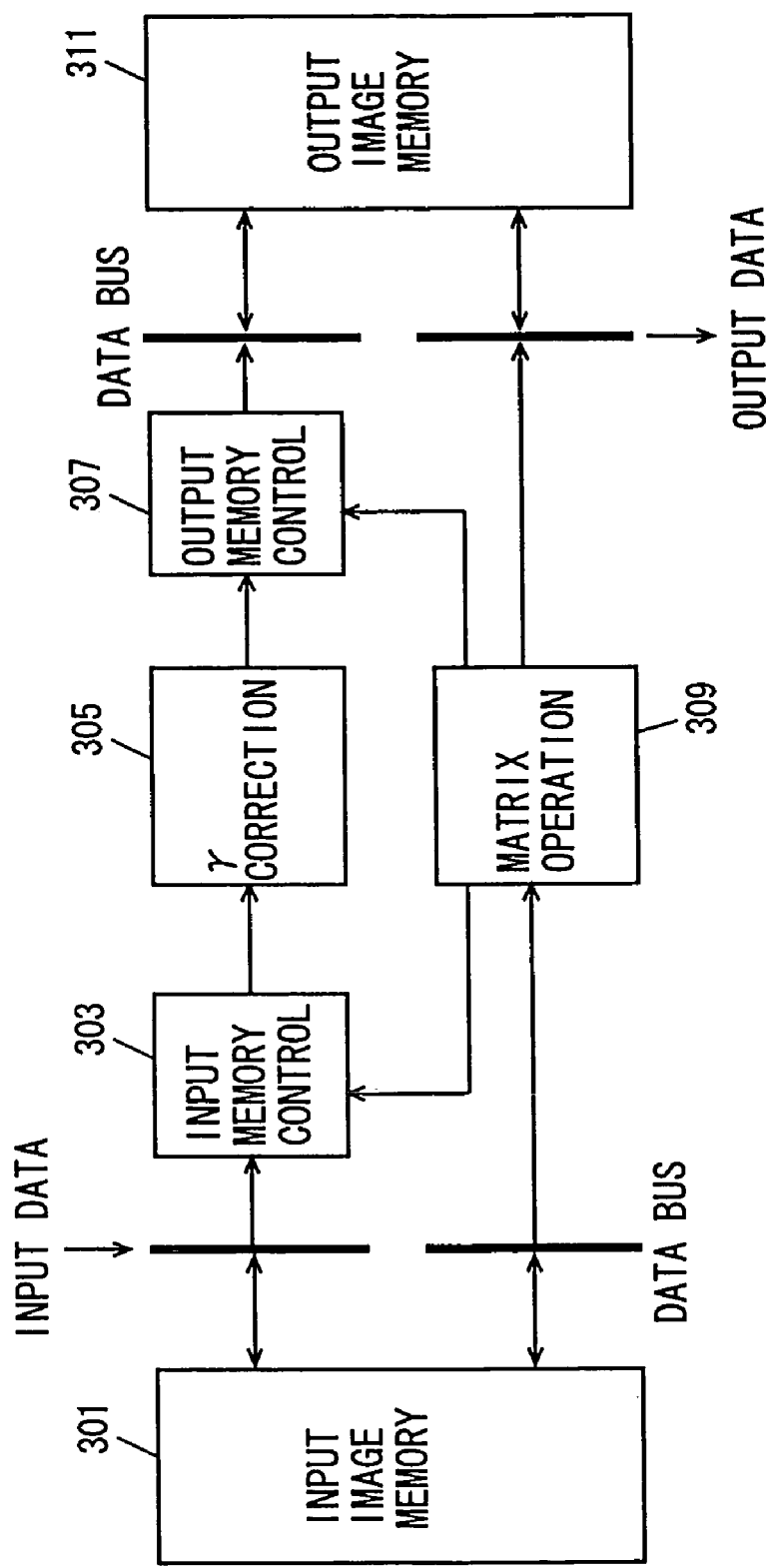
FIG. 8 is a block diagram showing the structure of an image processing apparatus according to a fourth embodiment of the present invention.

FIG. 8 is a block diagram showing a structure of an image processing apparatus according to a fourth embodiment of the present invention. The image processing apparatus of the present embodiment differs from the image processing apparatus of FIG. 3 in that input image memory 301 and output image memory 311 are set as dual port memories. Accordingly, the process by the synchronous type circuit and the process by the asynchronous type circuit can be carried out in parallel to further increase the image processing speed.

Figure 9:
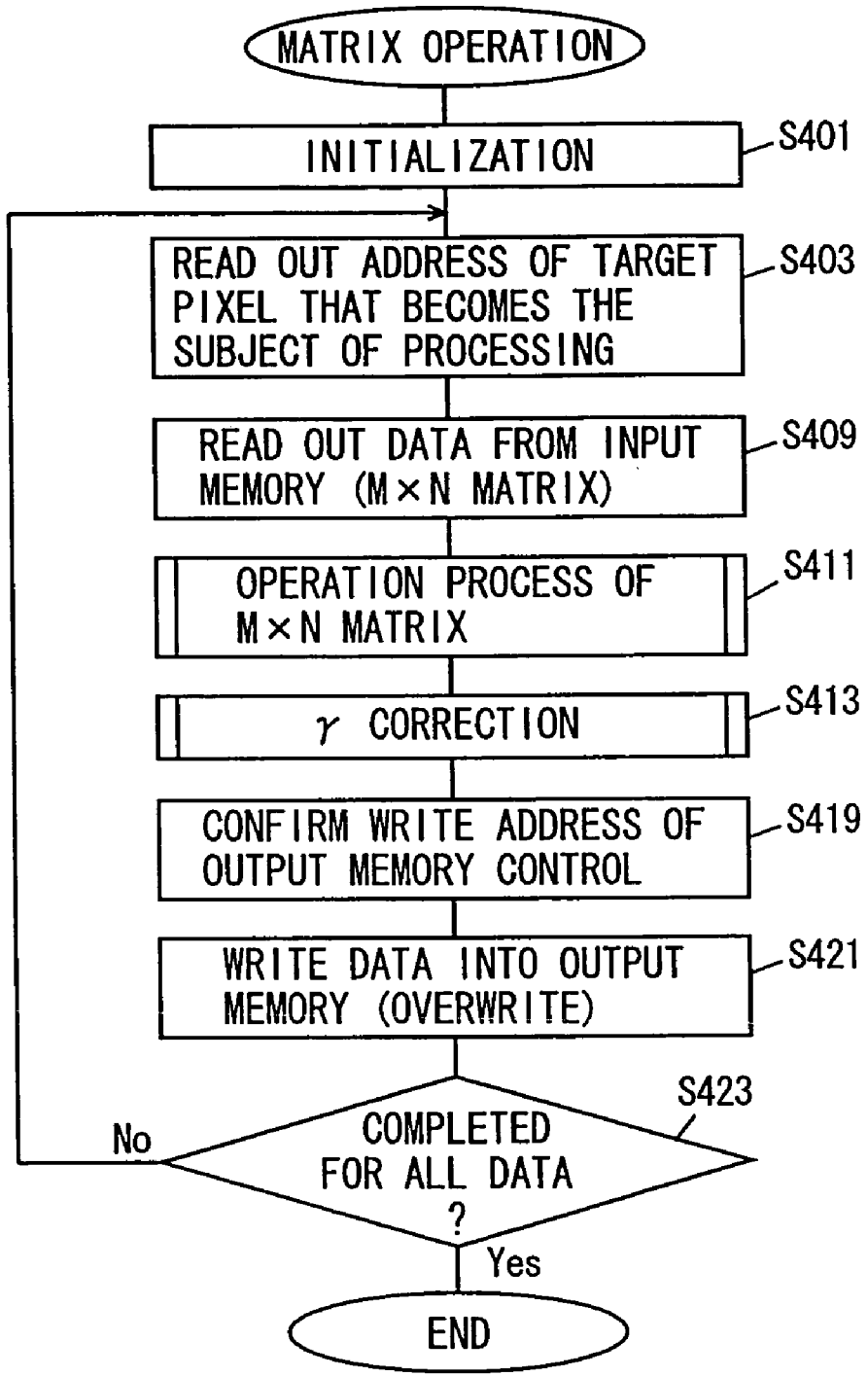
FIG. 9 is a flow chart of a process of a matrix operation unit 309 of FIG. 8.

FIG. 9 is a flow chart of the process carried out by a matrix operation unit 309 according to the image processing apparatus of the fourth embodiment. The flow chart of FIG. 9 differs from the flow chart of FIG. 4 in that the step of identifying the access status of the input image memory and the output image memory through the imb flag and the omb flag (steps S105, S107, S115 and S117 of FIG. 4) is deleted. This is because matrix operation unit 309 can access the memory any time without taking account of the access to the memory in the fourth embodiment.

It is to be noted that the output result of matrix operation unit 309 must be overwritten after the output result of the synchronous type circuit is written into output image memory 311. Therefore, control is provided so that the writing status into output image memory 311 by output memory control unit 307 is identified at step S419 of FIG. 9 to allow the operation result of matrix operation unit 309 to be written into output image memory 311 after the output result from the synchronous type circuit is written.

Figure 10:
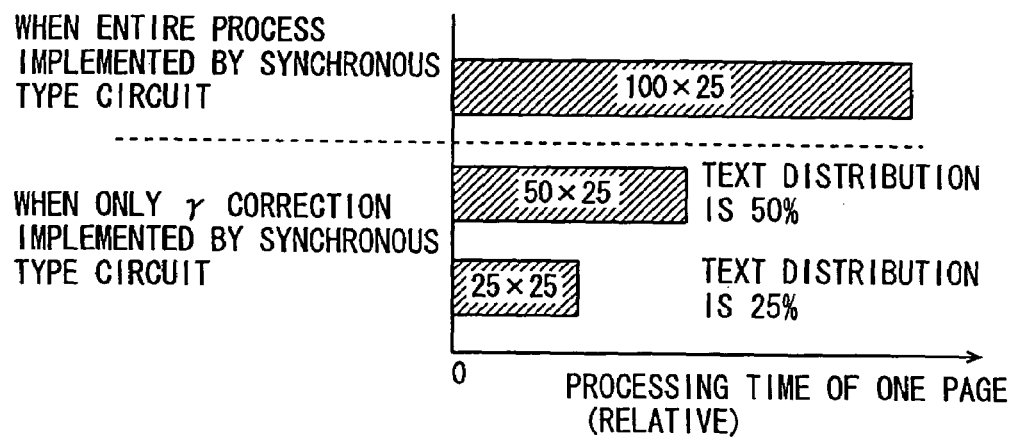
FIG. 10 is a diagram to describe the advantage of the image processing apparatus of the present invention.
Figure 11:
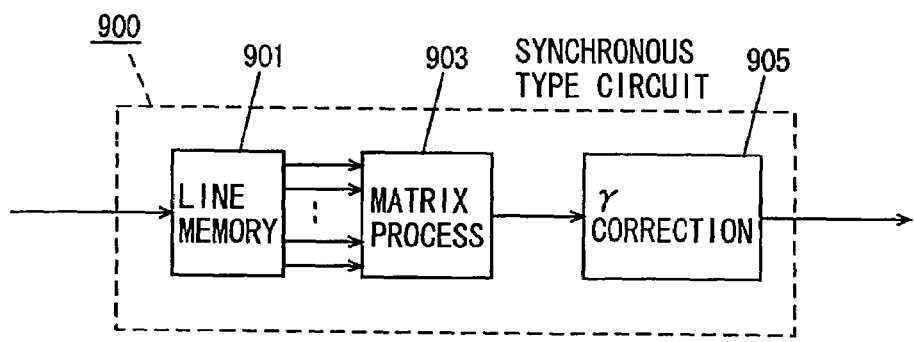
FIG. 11 is a block diagram showing an example of an image processing apparatus formed of only a synchronous circuit.

FIG. 10 is a diagram to describe the advantage of the image processing apparatus of the present invention. It is assumed that the relative ratio of the image processing time is γ correction (one-dimensional process): text correction (5×5 matrix operation)=1:25 and one page of image data is formed of 100 pixels. When the entire process is carried out by a synchronous type circuit, i.e. when matrix operation is carried out with the synchronous type circuit on all the regions, the processing time of one page is 100 (pixels)×25. When only the γ correction is carried out by the synchronous type circuit as in the above embodiments, i.e. when matrix operation is carried out with the asynchronous type circuit only on a particular region (text distributed region), the processing time is 50 (pixels)×25 and 25 (pixels)×25 in the case where the text is distributed for 50% and 25% in one page, respectively.

In other words, the processing time becomes longer when the all the process is carried out by a synchronous type circuit since text correction (5×5 matrix operation) is carried out on all the pixels irrespective of the text distribution. In contrast, only the required portion is subjected to text correction by virtue of the usage of both a synchronous type circuit and an asynchronous type circuit as in the above embodiments. Therefore, the processing speed is improved.

In the above embodiments, the processes are executed within a unitary apparatus. However, the processes can be carried out by a plurality of apparatuses. For example, the synchronous processing unit and the asynchronous processing unit can be implemented by separate apparatuses.

A program for executing the above process (S101–S123) stored in a storage medium can be loaded into the matrix operation unit and executed therewith.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   synchronous type processing means for carrying out a first image process on image data that is the subject of processing;
   asynchronous type processing means for carrying out a second image process on a region of said image data that is the subject of processing;
   synthesize means for synthesizing an output of said synchronous type processing means and an output of said asynchronous type processing means to form one image data, said synthesize means including:
     a memory in which an output of said synchronous type processing means is stored, and
     replacement means for replacing a portion of an output of said synchronous type processing means stored in said memory with an output of said asynchronous type processing means; and
   control means for controlling replacement timing by said replacement means by detecting status of an output of said synchronous type processing means stored in said memory.

2. An image processing apparatus comprising:
   a first image processor formed of a hardware circuit, and carrying out a first image process on input image data;
   a second image processor carrying out a second image process on a fragment of said input image data according to a program of predetermined software; and
   a memory in which image data subjected to said first image process and image data subjected to said second image process are synthesized and stored,
   wherein data of said memory in which image data subjected to the first image process is stored is overwritten by image data subjected to the second image process, and
   wherein said second image processor detects a write timing of said image data subjected to the first image process into said memory to control a write timing into said memory.

3. The image processing apparatus according to claim 2, wherein said software is rewritable.

4. An image processing apparatus comprising:
   a first image processor formed of a hardware circuit, and carrying out a first image process on input image data;
   a second image processor carrying out a second image process on a fragment of said input image data according to a program of predetermined software; and
   a memory in which image data subjected to said first image process and image data subjected to said second image process are synthesized and stored,
   wherein said second image processor detects a region on which the second image process is to be carried out by scanning input image data.

5. An image processing apparatus comprising:
   a synchronous type data processing device for carrying out a first image process on image data that is the subject of processing;
   an asynchronous type data processor for carrying out a second image process on a region of said image data that is the subject of processing;
   a data synthesizing device for synthesizing an output of said synchronous type processing device and an output of said asynchronous type processor to thereby form one image data, wherein said synthesizing device includes a memory for storing an output of said synchronous type processing device and said synthesizing device replaces a portion of an output of said synchronous type processing device stored in said memory with an output of said asynchronous type processor, and
   a controller for controlling a replacement timing in said synthesizing device by detecting a status of an output of said synchronous-type processing device which is stored in said memory.

* * * * *